US009522633B2

(12) United States Patent
Kim et al.

(10) Patent No.: US 9,522,633 B2
(45) Date of Patent: Dec. 20, 2016

(54) DRIVER CUSTOMIZABLE BLIND SPOT DISPLAY METHOD AND APPARATUS

(71) Applicant: Hyundai Motor Company, Seoul (KR)

(72) Inventors: Sam Yong Kim, Gyeonggi-do (KR); Jin Kwon Kim, Gyeonggi-do (KR); Ho Choul Jung, Gyeonggi-do (KR); Byoung Joon Lee, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/641,342

(22) Filed: Mar. 7, 2015

(65) Prior Publication Data

US 2016/0090043 A1 Mar. 31, 2016

(30) Foreign Application Priority Data

Sep. 26, 2014 (KR) ........................ 10-2014-0129097

(51) Int. Cl.
*B60R 1/02* (2006.01)
*B60R 1/08* (2006.01)

(52) U.S. Cl.
CPC ............... *B60R 1/081* (2013.01); *B60R 1/025* (2013.01)

(58) Field of Classification Search
USPC ......... 356/138, 614; 180/271; 359/843, 844, 359/840; 701/45, 49, 36, 523
See application file for complete search history.

(56) References Cited

U.S. PATENT DOCUMENTS

| 5,668,739 | A | * | 9/1997 | League | G01S 13/726 342/118 |
| 5,926,126 | A | * | 7/1999 | Engelman | B60K 31/0008 340/435 |
| 6,176,587 | B1 | * | 1/2001 | Fredricks | B60R 1/02 307/10.1 |
| 6,438,491 | B1 | * | 8/2002 | Farmer | B60W 30/16 340/435 |
| 6,501,536 | B1 | * | 12/2002 | Fredricks | B60R 1/02 180/271 |

(Continued)

FOREIGN PATENT DOCUMENTS

| JP | H06-262982 A | 9/1994 |
| JP | 2000-071877 A | 3/2000 |

(Continued)

*Primary Examiner* — Thomas Tarcza
*Assistant Examiner* — Richard Goldman
(74) *Attorney, Agent, or Firm* — Mintz Levin Cohn Ferris Glovsky and Popeo, P.C.; Peter F. Corless

(57) ABSTRACT

A driver customizable blind spot display method and apparatus are provided. The method of displaying blind spots of a vehicle via a screen mounted within a vehicle includes receiving information regarding positions of the driver's eyes from a driver state monitoring system and receiving current mirror setting information on a per in-vehicle mirror basis from a mirror drive unit. Blind spots and viewable spots are then calculated using the information regarding positions of the driver's eyes and the current mirror setting information. Particularly, the position of the driver's eyes is used to determine optimum mirror setting information. A mirror plane angle is then adjusted based on the optimum mirror setting information. A current blind spot coverage screen is then output to display the calculated blind spots and viewable spots.

24 Claims, 6 Drawing Sheets

(56) References Cited

U.S. PATENT DOCUMENTS

| | | | | |
|---|---|---|---|---|
| 6,756,888 B2* | 6/2004 | Su | B60R 1/025 | 340/435 |
| 6,882,287 B2* | 4/2005 | Schofield | B60Q 1/346 | 340/435 |
| 7,038,577 B2* | 5/2006 | Pawlicki | G06K 9/4604 | 340/435 |
| 7,379,813 B2* | 5/2008 | Kubota | G08G 1/0962 | 701/300 |
| 7,499,774 B2* | 3/2009 | Barrett | G05D 1/0061 | 340/426.11 |
| 7,720,580 B2* | 5/2010 | Higgins-Luthman | B60R 1/00 | 250/208.1 |
| 7,908,060 B2* | 3/2011 | Basson | G08G 1/166 | 340/435 |
| 8,013,889 B1* | 9/2011 | Hong | H04N 7/181 | 348/143 |
| 8,058,980 B2* | 11/2011 | Yanagi | B60R 1/00 | 340/435 |
| 8,190,355 B2* | 5/2012 | Emam | G08G 1/167 | 180/169 |
| 8,362,889 B2* | 1/2013 | Komori | G08G 1/096716 | 340/435 |
| 8,489,284 B2* | 7/2013 | Emam | G08G 1/161 | 340/438 |
| 8,645,001 B2* | 2/2014 | Basson | G08G 1/167 | 359/22 |
| 9,019,090 B2* | 4/2015 | Weller | B60R 1/12 | 340/425.5 |
| 9,159,235 B2* | 10/2015 | Hegemann | G08G 1/16 | |
| 9,248,834 B1* | 2/2016 | Ferguson | B60W 30/09 | |
| 2002/0005778 A1* | 1/2002 | Breed | B60Q 9/008 | 340/435 |
| 2002/0159171 A1* | 10/2002 | Schnell | B60R 1/025 | 359/877 |
| 2003/0151563 A1* | 8/2003 | Kulas | B60K 35/00 | 345/7 |
| 2004/0107030 A1* | 6/2004 | Nishira | B60W 40/02 | 701/36 |
| 2004/0165292 A1* | 8/2004 | Perkes | B60R 1/025 | 359/871 |
| 2006/0155444 A1* | 7/2006 | Lee | B60R 1/025 | 701/49 |
| 2006/0202984 A1* | 9/2006 | Yang | G06T 3/4038 | 345/419 |
| 2006/0238318 A1* | 10/2006 | Brouwer | B60R 1/12 | 340/435 |
| 2006/0290482 A1* | 12/2006 | Matsumoto | B60Q 1/2665 | 340/436 |
| 2007/0070197 A1* | 3/2007 | Akatsuka | G01S 17/023 | 348/118 |
| 2007/0081262 A1* | 4/2007 | Oizumi | B60R 1/00 | 359/843 |
| 2007/0142977 A1* | 6/2007 | Munoz | B60Q 1/22 | 701/1 |
| 2008/0043113 A1* | 2/2008 | Ishii | G06T 3/4038 | 348/218.1 |
| 2008/0046150 A1* | 2/2008 | Breed | B60R 21/0134 | 701/45 |
| 2008/0258896 A1* | 10/2008 | Stoller | B60R 1/00 | 340/459 |
| 2009/0022423 A1* | 1/2009 | Ehlgen | B60R 1/00 | 382/284 |
| 2009/0059403 A1* | 3/2009 | Chang | B60R 1/072 | 359/843 |
| 2009/0086019 A1* | 4/2009 | Okabe | B60R 1/00 | 348/118 |
| 2009/0096597 A1* | 4/2009 | Avery, Jr. | G08G 1/0962 | 340/435 |
| 2009/0097708 A1* | 4/2009 | Mizuta | G06T 11/00 | 382/103 |
| 2009/0189373 A1* | 7/2009 | Schramm | B60K 35/00 | 280/731 |
| 2010/0017071 A1* | 1/2010 | Ryu | B60R 1/02 | 701/49 |
| 2010/0049393 A1* | 2/2010 | Emam | G06N 5/02 | 701/31.4 |
| 2010/0194886 A1* | 8/2010 | Asari | G06T 7/002 | 348/148 |
| 2011/0026771 A1* | 2/2011 | Hsu | G06K 9/00805 | 382/104 |
| 2012/0022749 A1* | 1/2012 | Clegg | B60R 1/025 | 701/49 |
| 2012/0154591 A1* | 6/2012 | Baur | B60R 1/00 | 348/148 |
| 2013/0054086 A1* | 2/2013 | Lo | B60R 1/00 | 701/36 |
| 2013/0169425 A1* | 7/2013 | Victor | B60Q 1/525 | 340/435 |
| 2014/0152774 A1* | 6/2014 | Wakabayashi | G08G 1/168 | 348/46 |
| 2014/0313335 A1* | 10/2014 | Koravadi | H04N 7/181 | 348/148 |
| 2015/0092056 A1* | 4/2015 | Rau | G08G 1/167 | 348/148 |
| 2015/0138356 A1* | 5/2015 | Kowatari | B60R 1/00 | 348/144 |
| 2015/0191118 A1* | 7/2015 | Matsukawa | H04N 7/183 | 348/148 |
| 2015/0203035 A1* | 7/2015 | Watanabe | B62D 15/0295 | 382/103 |
| 2015/0222858 A1* | 8/2015 | Tanuki | B60R 1/00 | 348/148 |
| 2015/0232030 A1* | 8/2015 | Bongwald | B60R 1/00 | 348/115 |
| 2016/0046236 A1* | 2/2016 | Mozer | B60R 1/00 | 348/148 |
| 2016/0090043 A1* | 3/2016 | Kim | B60R 1/081 | 701/49 |

FOREIGN PATENT DOCUMENTS

| | | |
|---|---|---|
| JP | 2007-081590 A | 3/2007 |
| JP | 4026471 | 10/2007 |
| JP | 2008-265636 A | 11/2008 |
| JP | 2010-023680 A | 2/2010 |
| JP | 2010-143250 A | 7/2010 |
| JP | 2011-131678 A | 7/2011 |
| JP | 4862775 | 11/2011 |
| KR | 10-1154018 | 5/2012 |
| KR | 10-2013-0064867 A | 6/2013 |

* cited by examiner

SIDE MIRROR ADJUSTMENT

REAR - VIEW MIRROR ADJUSTMENT

USE EXAMPLE OF AUXILIARY MIRROR

EXISTING SIDE MIRROR    NEON SIDE MIRROR

USE EXAMPLE OF SPECIAL MIRROR

DRIVER CUSTOMIZABLE BLIND SPOT DISPLAY METHOD AND APPARATUS

CROSS REFERENCE TO RELATED APPLICATION(S)

This application claims the benefit of Korean Patent Application No. 10-2014-0129097, filed on Sep. 26, 2014, which is hereby incorporated by reference as if fully set forth herein.

BACKGROUND

Field of the Invention

The present invention relates to a driver customizable blind spot display method and apparatus and, more particularly, to a driver customizable blind spot display method and apparatus in which recommended mirror setting information for minimization of blind spots based on positions of the driver's eyes is calculated and automatically set and recommended mirror setting results are displayed on a screen, which enables a driver to directly view blind spots.

Discussion of the Related Art

Recent rapid development of information technology (IT) is exerting a great influence on the vehicle industry. Vehicle manufacturers are developing vehicle safety improvements and driver conveniences by grafting various IT technologies and sensor technologies onto vehicles. Particularly, for safer driving, it is important to appropriately adjust angles of various mirrors equipped within an extraneous to vehicles and to maintain the adjusted angles of the mirrors. Currently, many vehicles employ manual or remote mirror adjustment methods using mirror angle adjustment switches.

These mirror angle adjustment methods, however, require manual driver operation, thus causing difficulty in accurate mirror angle adjustment and time required for mirror angle adjustment. In addition, when a driver of a vehicle changes, the new driver is required to adjust angles of mirrors manually or remotely, increasing user inconvenience. In addition, accurately adjusting angles of mirrors in a stationary state of vehicles increases adjustment difficult, and mirror angle adjustment during driving increases potential vehicle collisions.

As solutions related to the above-described problems, various methods of adjusting angles of mirrors in an automated manner have recently been developed. These methods may be broadly classified into partially automatic methods and fully automatic methods. In the partially automatic methods, when one mirror is manually adjusted, one or all of the other mirrors are automatically adjusted. In fully automatic methods, all of three mirrors are automatically adjusted. Many partially automatic and fully automatic mirror adjustment methods are adapted to calculate angles of mirrors corresponding to positions of the driver's eyes by extracting the positions of the driver's eyes using various position and angle sensors, image sensing devices, image processors, and the like. Owing to recent development of computer science as well as improved precision and low price of optical devices, sensors and the like, there are suggested various other automatic mirror angle adjustment methods. However, there are no methods of the related art that allow drivers to view blind spots and viewable spots with their eyes via automatic mirror angle adjustment as described above.

SUMMARY

Accordingly, the present invention provides a driver customizable blind spot display method and apparatus that substantially obviate one or more problems due to limitations and disadvantages of the related art.

An object of the present invention provides a driver customizable blind spot display method and apparatus which are capable of displaying, on a screen, viewable spots and blind spots based on angles of mirrors automatically adjusted to correspond to positions of the driver's eyes (e.g., a pupil position or height). Another object of the present invention provides a driver customizable blind spot display method and apparatus which are capable of allowing drivers to detect blind spots that correspond to currently set mirror angles via a screen and recommending mirror angle setting for minimization of blind spots, thereby enabling safe traveling.

Additionally, another object of the present invention provides a driver customizable blind spot display method and apparatus which are capable of sensing position displacement of a driver seat and mirror angle adjustment in real time and displaying resultant variation of blind spots on a screen in real time. A further object of the present invention provides a driver customizable blind spot display method and apparatus which are capable of outputting a prescribed warning message when blind spots are widened due to position displacement of a driver seat, mirror angle adjustment, and the like.

Technical objects to be accomplished by the present invention are not limited to the aforementioned technical objects, and other unmentioned technical objects will be clearly understood from the following description by those having ordinary skill in the art. Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, the present invention provides a driver customizable blind spot display method and apparatus.

In accordance with one aspect of the present invention, a method of displaying blind spots of a vehicle via a screen mounted within a vehicle, may include receiving information regarding positions of a driver's eyes from a driver state monitoring system, receiving current mirror setting information regarding a per in-vehicle mirror basis from a mirror drive unit, calculating blind spots and viewable spots using the information regarding positions of the driver's eyes and the current mirror setting information, and outputting a current blind spot coverage screen displaying the calculated blind spots and viewable spots.

The current mirror setting information may include at least one of a drive motor encoder value on a per in-vehicle mirror basis and mirror plane angle information. The current blind spot coverage screen may further display information regarding a ratio of an area of all blind spots to an area of all blind spots covered based on the current mirror setting information. Additionally, the current blind spot coverage screen may be configured to display a prescribed warning message at one side thereof when the ratio is a first reference value or less. The current blind spot coverage screen may also be configured to display a recommendation button at one side thereof when the ratio is a first reference value or less, and the mirror plane angle may be automatically adjusted to minimize blind spots of the vehicle upon selection of the recommendation button.

The method may further include, when the mirror setting information is changed based on an operation of an in-vehicle mirror adjustment button, receiving the changed mirror setting information from the mirror drive unit, recalculating the blind spots and the viewable spots using the changed mirror setting information, and displaying the recalculated blind spots and viewable spots on the current blind spot coverage screen.

A ratio of an area of all blind spots to an area of all blind spots covered (e.g., blind spots which are made visible) based on the changed mirror setting information may be calculated in real time and displayed on the current blind spot coverage screen. A guidance message indicating minimized blind spots may be output when the ratio calculated in real time coincides with a second reference value. In addition to the guidance message, a storage button may be displayed when the ratio calculated in real time coincides with the second reference value, and the changed mirror setting information may be stored upon selection of the storage button. In addition to the changed mirror setting information, the driver's name may be input and stored upon selection of the storage button.

The method may further include calculating optimum mirror setting information for minimization of blind spots of the vehicle to correspond to the information regarding positions of the driver's eyes, and displaying a recommended blind spot coverage screen displaying blind spots and viewable spots based on the optimum mirror setting information.

The recommended blind spot coverage screen may further be configured to display information regarding a ratio of an area of all blind spots to an area of all blind spots covered based on the optimum mirror setting information. The recommended blind spot coverage screen may further be configured to display a recommendation button, and the mirror plane angle of an in-vehicle mirror may be adjusted based on the optimum mirror setting information upon selection of the recommendation button. Automatic switching from the current blind spot display screen to the recommended blind spot display screen may be performed when a prescribed time has passed (e.g., elapsed) after the display of the current blind spot display screen.

The mirror plane angle of an in-vehicle mirror may be automatically adjusted based on the optimum mirror setting information when a prescribed time has passed after the automatic switching from the current blind spot display screen to the recommended blind spot display screen. The blind spots and the viewable spots may be configured and displayed in the form of a visually identifiable image.

A computer readable recording medium may be configured to store a program to execute any one method among blind spot display methods according to another exemplary embodiment of the present invention may be provided.

In accordance with another aspect of the present invention, an apparatus of displaying blind spots of a vehicle may include a plurality of units executed by a controller having a processor and a memory. The plurality of units may include a unit configured to receive information regarding positions of the driver's eyes from a driver state monitoring system, a unit configured to receive current mirror setting information on a per in-vehicle mirror basis from a mirror drive unit (e.g., a mirror controller), a unit configured to calculate blind spots and viewable spots using the information regarding positions of the driver's eyes and the current mirror setting information, and a unit configured to output a current blind spot coverage screen that displays the calculated blind spots and viewable spots.

The current mirror setting information may include at least one of a drive motor encoder value on a per in-vehicle mirror basis and mirror plane angle information. The apparatus may further include a unit configured to calculate a ratio of an area of all blind spots to an area of all blind spots covered based on the current mirror setting information and to display the calculated ratio on the current blind spot coverage screen.

The current blind spot coverage screen may be configured to display a prescribed warning message at one side thereof when the ratio is equal to a first reference value or less. The current blind spot coverage screen may also be configured to display a recommendation button at one side thereof when the ratio is equal to a first reference value or less, and the mirror plane angle may be adjusted to minimize blind spots of the vehicle upon selection of the recommendation button.

In addition, when the mirror setting information is changed based on an operation of an in-vehicle mirror adjustment button, the apparatus may include a unit configured to recalculate the blind spots and the viewable spots using the changed mirror setting information, and a unit configured to display the recalculated blind spots and viewable spots on the current blind spot coverage screen.

A ratio of an area of all blind spots to an area of all blind spots covered based on the changed mirror setting information may be calculated in real time and displayed on at least one side of the current blind spot coverage screen. A guidance message indicating minimized blind spots may be output when the ratio calculated in real time coincides with a second reference value. In addition to the guidance message, a storage button may be displayed when the ratio calculated in real time coincides with the second reference value, and the changed mirror setting information may be stored in an inner memory upon selection of the storage button. In addition to the changed mirror setting information, the driver's name may be input and stored upon selection of the storage button.

The apparatus may further include a unit configured to calculate optimum mirror setting information for minimization of blind spots of the vehicle to correspond to the information regarding positions of the driver's eyes, and a unit configured to display a recommended blind spot coverage screen that displays blind spots and viewable spots based on the optimum mirror setting information. Additionally, the apparatus may include a unit configured to calculate a ratio of an area of all blind spots to an area of all blind spots covered based on the optimum mirror setting information and to display the calculated ratio on the recommended blind spot coverage screen.

The recommended blind spot coverage screen may further be configured to display a recommendation button, and the mirror plane angle of an in-vehicle mirror may be adjusted based on the optimum mirror setting information upon selection of the recommendation button. Automatic switching from the current blind spot display screen to the recommended blind spot display screen may be performed when a prescribed time has passed after display of the current blind spot display screen. The mirror plane angle of an in-vehicle mirror may be adjusted based on the optimum mirror setting information when a prescribed time has passed after the automatic switching from the current blind spot display screen to the recommended blind spot display screen. The blind spots and the viewable spots may be configured and displayed in the form of a visually identifiable image.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate exemplary embodiment(s) of the invention and together with the description serve to explain the principle of the invention. In the drawings.

DETAILED DESCRIPTION

Figure 1:
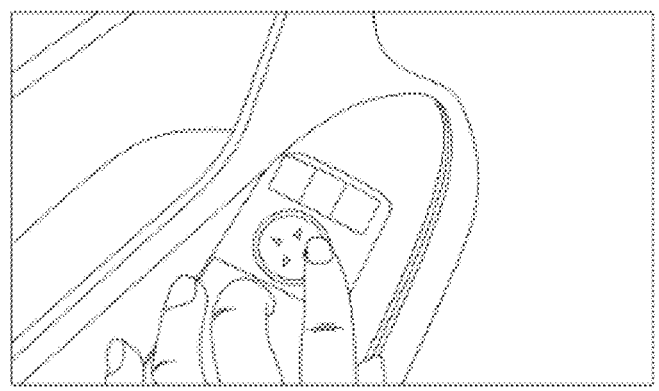
FIG. 1 is an exemplary view illustrating a conventional mirror angle adjustment method according to the related art.
Figure 1:
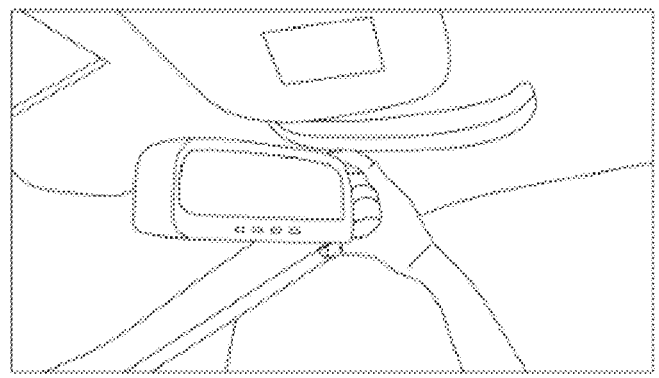

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum).

Although exemplary embodiments are described as using a plurality of units to perform the exemplary process, it is understood that the exemplary process may also be performed by one or a plurality of modules. Additionally, it is understood that the term controller/control unit refers to a hardware device that includes a memory and a process. The memory is configured to store the modules and the process is specifically configured to execute said modules to perform one or more processes which are described further below.

Furthermore, control logic of the present invention may be embodied as non-transitory computer readable media on a computer readable medium containing executable program instructions executed by a process, controller/control unit or the like. Examples of the computer readable mediums includes, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server of a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Reference will now be made in detail to the exemplary embodiments of the present invention, examples of which are illustrated in the accompanying drawings. The suffixes "module" and "unit" of elements herein are used for convenience of description and thus can be used interchangeably and do not have any distinguishable meanings or functions.

Although all elements constituting the exemplary embodiments of the present invention are described to be integrated into a single one or to be operated as a single one, the present invention is not necessarily limited to such exemplary embodiments. According to exemplary embodiments, all of the elements may be selectively integrated into one or more and be operated as one or more within the object and the scope of the present invention. Each of the elements may be implemented as independent hardware. Alternatively, some or all of the elements may be selectively combined into a computer program having a program module performing some or all functions combined in one or more pieces of hardware. A plurality of codes and code segments constituting the computer program may be easily reasoned by those skilled in the art to which the present invention pertains. The computer program may be stored in a computer readable media such that the computer program is read and executed by a computer to implement exemplary embodiments of the present invention. Computer program storage media may include magnetic recording media, optical recording media, and carrier wave media.

All terms including technical or scientific terms have the same meanings as generally understood by a person having ordinary skill in the art to which the present invention pertains unless mentioned otherwise. Generally used terms, such as terms defined in a dictionary, should be interpreted to coincide with meanings of the related art from the context. Unless obviously defined in the present invention, such terms are not interpreted as ideal or excessively formal meanings.

It will be understood that, although the terms first, second, A, B, (a), (b), etc. may be used herein to describe various elements of the present invention, these terms are only used to distinguish one element from another element and essential, order, or sequence of corresponding elements are not limited by these terms. It will be understood that when one element is referred to as being "connected to", "coupled to", or "accessed to" another element, one element may be "connected to", "coupled to", or "accessed to" another element via a further element although one element may be directly connected to or directly accessed to another element.

FIG. 1 is an exemplary view illustrating a conventional mirror angle adjustment method. Referring to FIG. 1, conventionally, an angle of a side mirror has been adjusted as a driver operates mirror adjustment buttons disposed within a door of a driver seat, and for a rear-view mirror, the driver is required to directly adjust an angle of the rear-view mirror manually.

Figure 2:
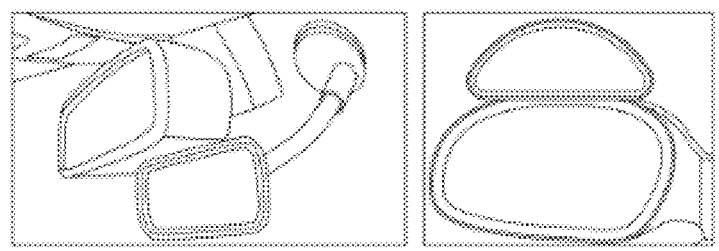
FIG. 2 is an exemplary view illustrating a conventional method to solve blind spots according to the related art.
Figure 2:
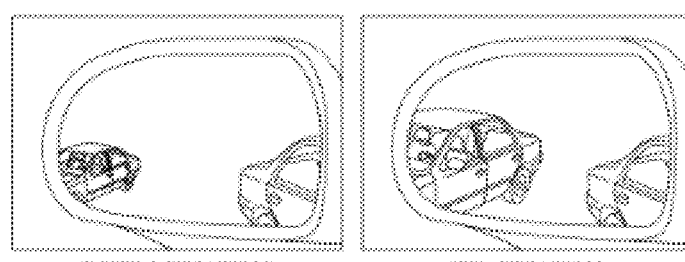

FIG. 2 is an exemplary view illustrating a conventional method of solving the issue of blind spots. Referring to FIG. 2, conventionally, methods for solving blind spots include mounting an auxiliary mirror to one side of a side mirror or using a specialized mirror such as a neon side mirror. However, this auxiliary mirror has disadvantages of deteriorating an aesthetic appearance of a vehicle and of causing damage to the side mirror.

Figure 3:
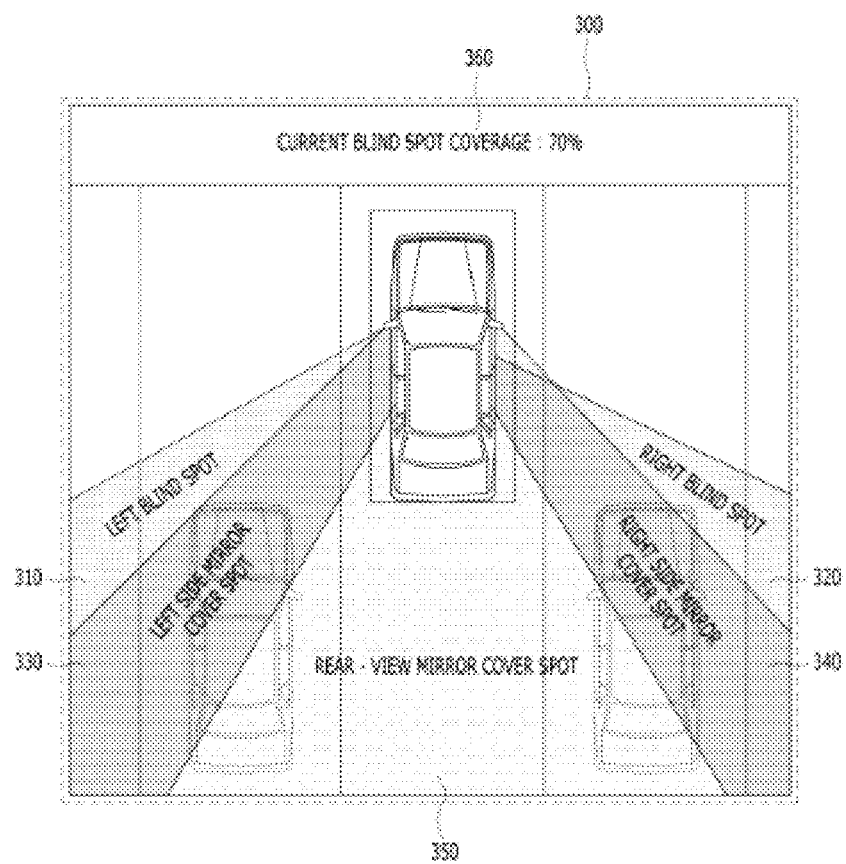
FIG. 3 is an exemplary view of a current blind spot coverage screen according to an exemplary embodiment of the present invention.

FIG. 3 is an exemplary view of a current blind spot coverage screen according to an exemplary embodiment of the present invention. A blind spot display apparatus according to the present invention may be configured to calculate blind spots and viewable spots based on a gradient of a mirror estimated by a current mirror driving encoder value and a mirror plane angle, information regarding positions of the driver's eyes, and the like, and then may be configured to display a current blind spot coverage screen 300 based on the calculated results.

The mirror driving encoder value may be a mirror gradient set value currently applied to left and right side mirrors of the vehicle. The mirror driving encoder value may be maintained in a memory of an Electronic Control Unit (ECU) that may be configured to adjust a gradient of side mirrors. The blind spot display apparatus may be configured to receive the mirror driving encoder value from the corresponding ECU via a prescribed control procedure when power is applied after starting the vehicle. In another embodiment, the blind spot display apparatus may be configured to receive the mirror driving encoder value from the corresponding ECU when the driver changes a gradient of a mirror.

The blind spot display apparatus according to the present invention may be configured to acquire information regarding current positions of the driver's eyes in cooperation with a driver state monitoring (DSM) system mounted within the vehicle. In one example, the DSM system may include an imaging device (e.g., a camera, a video camera, or the like) configured to capture images of the driver (e.g., the face, the iris and the like) and a sensor configured to sense positions of the driver's eyes, movement of the driver's eyes, facial expression, and the like by analyzing the images captured by the imaging device. In particular, the imaging device may include a plurality of cameras, and may be mounted at positions to capture the driver's face, such as at the rear of a steering wheel, etc. The blind spot display apparatus according to the present invention may utilize a screen of an audio video navigation (AVN) system equipped with a touch panel.

It should be noted that, in another exemplary embodiment of the present invention, the blind spot display apparatus may include a separate screen mounted within the vehicle. Generally, the DSM system may be used to sense dozing off at the wheel (e.g., driver fatigue), blinking, yawning, negligence of forward gazing and the like of the driver and to output a prescribed warning signal based on the sensed results.

In another exemplary embodiment of the present invention, the blind spot display apparatus may be configured to acquire information regarding positions of the driver's eyes in cooperation with a wearable device equipped with a imaging device, a gyro sensor and the like, for example, smart glasses. As exemplarily shown in FIG. 3, blind spots displayed on the current blind spot coverage screen 300 may include a left blind spot 310 and a right blind spot 320 and viewable spots may include a left side mirror cover spot 330, a right side mirror cover spot 340, and a rear-view mirror cover spot 350. In particular, these spots may be displayed on the screen in different colors and the adjacent spots may be displayed as partially overlapping each other.

In addition, first blind spot cover ratio information 360 based on a current mirror setting may be displayed at an upper end of the current blind spot coverage screen 300. The first blind spot cover ratio may refer to a ratio of an area of all blind spots of the vehicle to an area of all blind spots covered based on current mirror setting. Accordingly, the present invention may be configured to display blind spots and viewable spots that correspond to current mirror setting information in the form of images that are visually identifiable, thereby allowing the driver to detect whether mirrors are normally set (e.g., set to allow blind spots to be viewable).

Figure 4:
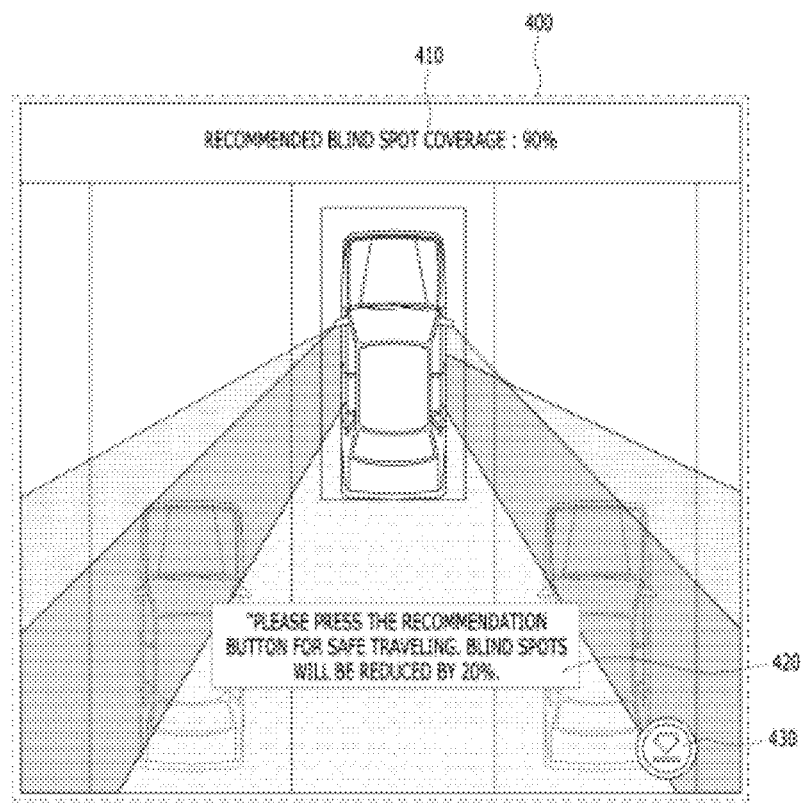
FIG. 4 is an exemplary view of a recommended blind spot coverage screen according to an exemplary embodiment of the present invention.

FIG. 4 is an exemplary view of a recommended blind spot coverage screen according to an exemplary embodiment of the present invention. Referring to FIG. 4, the blind spot display apparatus may be configured to calculate optimum mirror setting information based on information regarding current positions of the driver's eyes, and may be configured to display a recommended blind spot coverage screen 400 that shows optimum (or recommended) viewable spot images based on the calculated optimum mirror setting information and second blind spot cover ratio information 410 calculated based on the optimum mirror setting information. Particularly, a second blind spot cover ratio may refer to a ratio of an area of all blind spots to an area of blind spots covered by optimum mirror setting, and the optimum mirror setting information may include a mirror driving encoder value, an angle of a mirror face, and the like for minimization of an area of blind spots.

In addition, a pop-up notice window 420 that shows a prescribed guidance message and a recommendation button 430 for changing from current mirror setting to optimum (or recommended) mirror setting may be displayed at one side of the recommended blind spot coverage screen 400. In one example, the guidance message may be "Please press the recommendation button for safe traveling. Blind spots will be reduced by 20%." In particular, when the recommendation button 430 is selected by the driver, a recommendation mirror setting value for minimization of an area of blind spots may be transmitted to a mirror drive unit to adjust left and right side mirrors and a rear-view mirror.

In another exemplary embodiment of the present invention, the blind spot display apparatus may be configured to automatically switch from the current blind spot display screen 300 to the recommended blind spot display screen 400 after a prescribed time has elapsed, which may be set by the driver or by a vehicle manufacturer. In addition, the blind spot display apparatus may be configured to automatically adjust an angle of a mirror mounted within the vehicle based on recommended mirror setting values when a prescribed time has elapsed after the automatic switching from the current blind spot display screen 300 to the recommended blind spot display screen 400.

Figure 5:
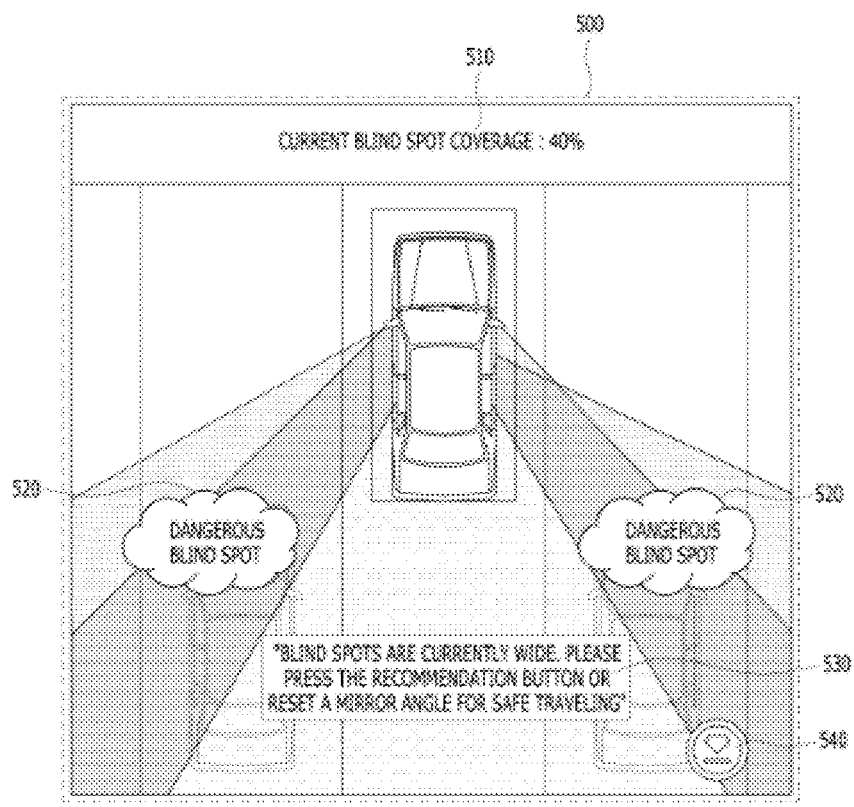
FIG. 5 is an exemplary view illustrating a warning screen depending on change of mirror setting according to another exemplary embodiment of the present invention.

FIG. 5 is an exemplary view illustrating a warning screen based on a change of a mirror setting according to another exemplary embodiment of the present invention. Referring to FIG. 5, when blind spots are widened beyond a reference value as the driver arbitrarily changes an angle of a mirror using mirror adjustment buttons, or when a ratio of an area of all blind spots to an area of blind spots based on changed mirror setting is equal to a reference value or less, a mirror setting warning screen 500 including prescribed warning messages 520 and 530 may be displayed. In particular, a prescribed warning sound or voice warning messages may be additionally output.

The mirror setting warning screen 500 may further include current blind spot coverage ratio information 510 and a recommendation button 540. In one example, when a blind spot coverage ratio calculated in real time as the driver adjusts mirrors is about 60% or less, the blind spot display apparatus according to the present invention may be configured to display the mirror setting warning screen 500 as exemplarily shown in FIG. 5.

Figure 6:
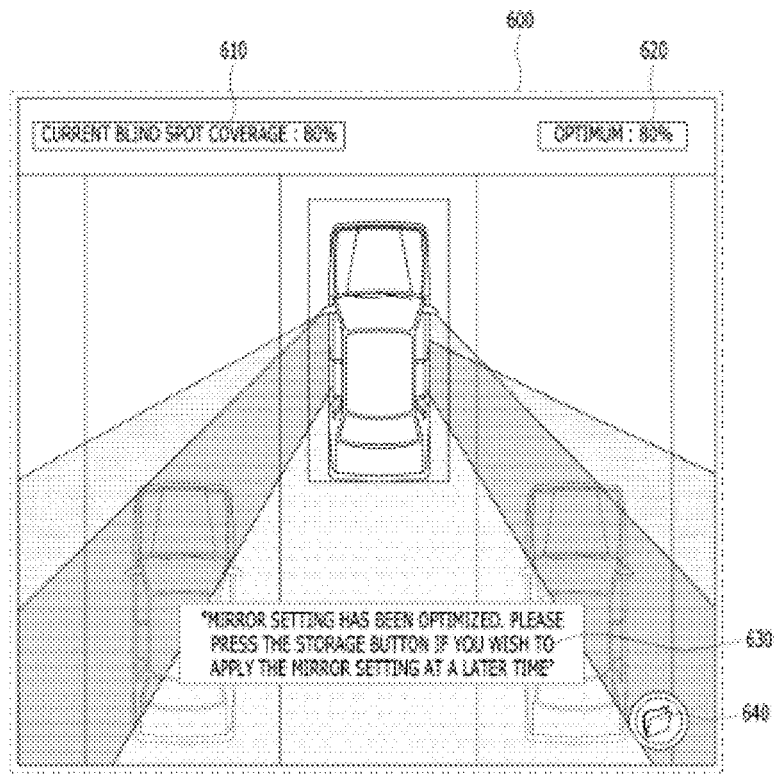
FIG. 6 is an exemplary view illustrating a method of storing optimum mirror setting information according to another exemplary embodiment of the present invention.

FIG. 6 is an exemplary view illustrating a method of storing optimum mirror setting information according to another exemplary embodiment of the present invention. Referring to FIG. 6, the blind spot display apparatus may be configured to assist a driver in detecting optimum mirror setting of a vehicle. Particularly, the blind spot display apparatus may be configured to calculate a ratio (or area) of blind spots in real time when mirror setting is changed via operation of mirror adjustment buttons and then may be configured to display the calculated results on a current blind spot coverage ratio display region 610. Additionally, information regarding an optimum blind spot coverage ratio that may be achieved by operating mirrors of the corresponding vehicle may be displayed on an optimum blind spot coverage ratio display region 620.

When optimum mirror setting is achieved as the driver operates mirrors, the blind spot display apparatus may be configured to generate and display a prescribed pop-up guidance message 630 that indicates that optimum mirror setting is completed as well as a storage button 640 for storage of current mirror setting on the screen. In particular, the driver may visually detect variation of blind spots based on mirror operation via the screen. In other words, the blind spot display apparatus according to the present invention may be configured to receive changed mirror setting information from the mirror drive unit (e.g., mirror controller) when current mirror setting information is changed via operation of the mirror adjustment buttons mounted within the vehicle (in other words, when an angle of a mirror is changed), and then may be configured to recalculate blind spots and viewable spots that correspond to the changed mirror setting information. Subsequently, the blind spot display apparatus may be configured to display the recalculated blind spots and viewable spots on the screen in real time.

Figure 7:
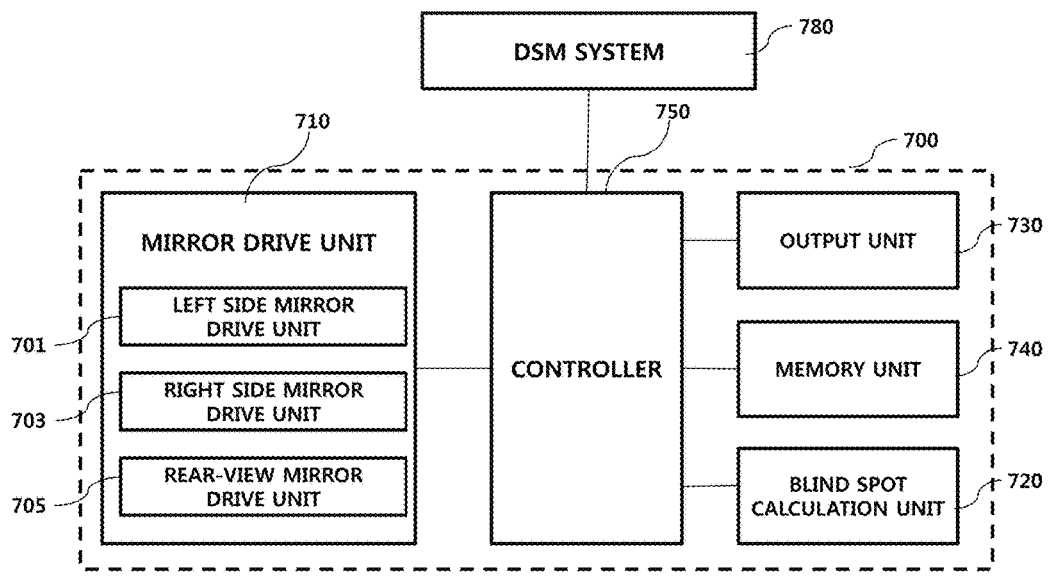
FIG. 7 is an exemplary block diagram illustrating an inner configuration of a blind spot display apparatus according to an exemplary embodiment of the present invention.

FIG. 7 is an exemplary block diagram illustrating an inner configuration of the blind spot display apparatus according to an exemplary embodiment of the present invention. Referring to FIG. 7, the blind spot display apparatus 700 may include a mirror drive unit 710, a blind spot calculation unit 720, an output unit 730, a memory unit 740, and a controller 750. The controller 750 may be configured to execute the various units of the blind spot display apparatus 700.

The blind spot display apparatus 700 may be configured to acquire information regarding positions of the driver's eyes in cooperation with a DSM system 780 mounted within the vehicle. In addition, the blind spot display apparatus 700 may be connected to mirror adjustment buttons disposed near (e.g., in the vicinity of, in reaching distance of, etc.) a drive seat and adjust a gradient of a mirror as the driver operates the mirror adjustment buttons.

The mirror drive unit 710 may include a left side mirror drive unit 701, a right side mirror drive unit 703, and a rear-view mirror drive unit 705. The mirror drive unit 710 may be configured to adjust a gradient of a mirror based on a drive motor encoder value received from the controller 750. In other words, the various vehicle mirrors may be adjusted based on a drive motor encode value. In addition, the rear-view mirror drive unit 705 may be configured to adjust an orientation and a gradient of a rear-view mirror in response to a control signal of the controller 750. In particular, the driver may adjust the orientation of the rear-view mirror using the mirror adjustment buttons.

In addition, the mirror drive unit 710 may be configured to transmit a drive motor encoder value and mirror plane angle information to the controller 750 in response to a request of the controller 750. Subsequently, the controller 750 may be configured to transmit the drive motor encoder value and the mirror plane angle information received from the mirror drive unit 710 and the information regarding positions of the driver's eyes received from the DSM system 780 to the blind spot calculation unit 720, thereby executing calculation of a blind spot coverage ratio based on current mirror setting.

The blind spot calculation unit 720 may be configured to calculate a blind spot coverage ratio using the drive motor encoder value and the mirror plane angle information angle as well as the information regarding positions of the driver's eyes transmitted from the controller 750, and then may be configured to transmit the calculated results to the controller 750. In particular, the blind spot calculation unit 720 may be configured to calculate a blind spot coverage ratio based on current mirror setting and transmit the same to the controller 750.

In addition, the blind spot calculation unit 720 may be configured to calculate optimum mirror setting information that corresponds to the information regarding positions of the driver's eyes and transmit the calculated results to the controller 750. particular, the controller 750 may be configured to display the recommended blind spot coverage screen 400 that corresponds to the optimum mirror setting information on the screen. The driver may simply perform mirror setting for minimization of blind spots by selecting the recommendation button 430 displayed on the recommended blind spot coverage screen 400.

Furthermore, the blind spot calculation unit 720 may be configured to transmit a prescribed warning signal to the controller 750 when the blind spot coverage ratio calculated in real time as the driver adjusts mirrors decreases to a reference value or less. The controller 750 may be configured to display the mirror setting warning screen 500 in response to a warning notice signal. The driver may optimize mirror setting by selecting the recommendation button 540 displayed on the mirror setting warning screen 500.

Moreover, the blind spot calculation unit 720 may be configured to transmit a prescribed completion notice signal to the controller 750 when the blind spot coverage ratio calculated in real time as the driver adjusts mirrors reaches a blind spot coverage ratio that corresponds to the optimum mirror setting, i.e. an optimum blind spot coverage ratio.

The controller 750 may be configured to output a user interface screen that includes a current blind spot coverage ratio and an image to assist the driver in viewing a current blind spot coverage and then may be configured to transmit the user interface screen to the output unit 730. Subsequently, the output unit 730 may be configured to output the corresponding user interface screen on a display included in the output unit 730, for example, a touch panel. In addition, the controller 750 may be configured to execute implementation of optimum mirror setting that corresponds to positions of the driver's eyes by the blind spot calculation unit 720 when the driver selects the recommendation button 430 or 530.

In addition, the controller 750 may be configured to store and maintain mirror setting information optimized by mirror operation of the driver in the memory unit 740 when the driver selects the storage button 640. Particularly, upon selection of the storage button 640, a user interface screen used to receive the driver's name may be displayed, and the controller 750 may be configured to store the input driver's name and the changed mirror setting information in the memory unit 740. Accordingly, the blind spot display apparatus 700 according to the present invention enables driver customizable optimum mirror setting by maintaining mirror setting information optimized on a per vehicle driver basis.

The controller 750 may be configured to execute general operations of the blind spot display apparatus 700. In addition, the controller 750 may be configured to perform pattern recognition processing to recognize writing input or drawing input onto a touchscreen as letters and images respectively. The controller 750 may also be configured to adjust input and output in response to various control signals from lower modules, and provide a corresponding user interface screen. Particularly, the lower modules may include the mirror drive unit 710, the blind spot calculation unit 720, the output unit 730 and the memory unit 740 as described above.

The output unit 730 may be configured to generate visual, audible, tactile output and the like, and may include a display module, a sound output module and the like. The display module may be configured to display and output information processed in the blind spot display apparatus 700. For example, the display module may be configured to display information processed in real time in the blind spot display apparatus 700 in a user interface (UI) form or in a graphical user interface (GUI) form. The display module may include at least one of a liquid crystal display (LCD), a thin film transistor liquid crystal display, an organic light emitting diode display, a flexible display, and a 3-dimensional display.

Some of the displays mentioned above, may be a transparent or light transmitting display to allow a viewer to view the back of the display through the display. This display may be called a transparent display. A representative example of the transparent display may be a transparent LCD. A back structure of the display module may also be a light transmitting structure. There may be two or more display modules according to an embodied shape of the blind spot display apparatus 700. For example, in the blind spot display apparatus 700, a plurality of display modules may be spaced apart from one another or integrally combined with one another in a single plane, or may be respectively placed in different planes.

When the display module and a sensor configured to sense a touch (hereinafter, referred to as a "touch sensor") constitute a mutual layer structure (hereinafter, simply referred to as a "touchscreen"), the display module may be used as an input device in addition to an output device. The touch sensor may be configured as a touch film, a touch sheet, or a touchpad, for example. The touch sensor may be configured to convert pressure applied to a specific portion of the display module or change of capacitance generated from a specific portion of the display module to an electric input signal. The touch sensor may be configured to sense pressure of a touch as well as a touched position or area.

When a touch input is received by the touch sensor, a signal(s) that corresponds to the touch may be transmitted to a touch controller. The touch controller may be configured to process the signal(s) and transmit data that corresponds to the processed signal(s) to the controller 750. Therefore, the controller 750 may be configured to recognize which portion of the display module has been touched (e.g., a location where pressure has been exerted onto the display). The sound output module may be configured to output voice guidance messages, warning sound or the like. The sound output module may include a receiver, a speaker, and a buzzer. In addition, the sound output module may be configured to output sound through an earphone jack disposed at one side of the vehicle.

The memory unit 740 may be configured to store programs for operation of the controller 750, and temporarily store input/output data (e.g., information regarding optimum mirror setting on a per driver basis, notice messages on a per situation basis, sound effect files, voice files, image files, application programs, etc.). In addition, the memory unit 340 may be configured to store data on various vibration and sound patterns output during touch input on a touchscreen. The memory unit 340 may include at least one selected from among a flash memory type memory, a hard disk type memory, a multimedia card micro type memory, a card type memory (e.g., an SD or XD memory), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk.

As is apparent from the above description, the method and apparatus according to the present invention have the following effects.

First, the present invention has an advantage of providing a driver customizable blind spot display method and apparatus.

Second, the present invention has an advantage of providing a driver customizable blind spot display method and apparatus which are capable of displaying, on a screen, viewable spots and blind spots based on angles of mirrors automatically adjusted to correspond to positions of the driver's eyes.

Third, the present invention has an advantage of providing a driver customizable blind spot display method and apparatus which are capable of allowing drivers to detect blind spots that correspond to currently set mirror angles via a screen and recommending mirror angle setting for minimization of blind spots, thereby enabling safe traveling.

Fourth, the present invention has an advantage of providing a driver customizable blind spot display method and apparatus which are capable of sensing position displacement of a driver's seat and mirror angle adjustment in real time and displaying resultant variation of blind spots on a screen in real time.

Fifth, the present invention has an advantage of a driver customizable blind spot display method and apparatus which are capable of outputting a prescribed warning message when blind spots are widened due to position displacement of a driver's seat, mirror angle adjustment and the like, thereby enabling safe traveling.

Sixth, the present invention has an advantage of enabling mirror angle setting for minimization of blind slots by inexperienced drivers without complicated operation.

Seventh, the present invention has an advantage of minimizing blind spots without deterioration in the aesthetic appearance of a vehicle.

It will be appreciated by persons skilled in the art that that the effects that can be achieved through the present invention are not limited to what has been particularly described hereinabove and other advantages of the present invention will be more clearly understood from the above detailed description. It will be apparent to those skilled in the art that various modifications and variations can be made in the present invention without departing from the spirit and essential features of the inventions.

Thus, the above detailed description should not be construed to limit the present invention in all aspects, but considered to exemplify the present invention. The scope of the present invention should be determined by reasonable interpretation of the appended claims and the present invention covers the modifications and variations of this invention provided they come within the scope of the appended claims and their equivalents.

What is claimed is:

1. A method of displaying blind spots of a vehicle via a screen equipped in a vehicle, comprising:
   receiving, by a controller, information regarding positions of the driver's eyes from a driver state monitoring system;
   receiving, by the controller, current mirror setting information on a per in-vehicle mirror basis from a mirror drive unit;
   calculating, by the controller, blind spots and viewable spots using the information regarding positions of the driver's eyes and the current mirror setting information; and
   outputting, by an output unit, a current blind spot coverage screen that displays the calculated blind spots and viewable spots,
   wherein the blind spots indicate currently non-viewable spots which are made viewable by changing the mirror setting and the current blind spot coverage indicates an area which is made viewable by the current mirror setting among the blind spots.

2. The method according to claim 1, wherein the current mirror setting information includes at least one of a drive motor encoder value on a per in-vehicle mirror basis and mirror plane angle information.

3. The method according to claim 1, wherein the current blind spot coverage screen further displays information regarding a ratio of an area of all blind spots to an area of all blind spots covered based on the current mirror setting information.

4. The method according to claim 3, wherein the current blind spot coverage screen displays a prescribed warning message at one side thereof when the ratio is a first reference value or less.

5. The method according to claim 3, wherein the current blind spot coverage screen displays a recommendation button at one side thereof when the ratio is a first reference value or less, and the mirror plane angle is automatically adjusted to minimize blind spots of the vehicle upon selection of the recommendation button.

6. The method according to claim 1, further comprising:
   receiving, by the controller, the changed mirror setting information from the mirror drive unit when the mirror setting information is changed according to operation of an in-vehicle mirror adjustment button;
   recalculating, by the controller, the blind spots and the viewable spots using the changed mirror setting information; and
   displaying, by the controller, the recalculated blind spots and viewable spots on the current blind spot coverage screen.

7. The method according to claim 6, wherein a ratio of an area of all blind spots to an area of all blind spots covered based on the changed mirror setting information is calculated in real time and displayed on the current blind spot coverage screen.

8. The method according to claim 7, wherein a guidance message that indicates minimized blind spots is output when the ratio calculated in real time coincides with a second reference value.

9. The method according to claim 8, wherein, a storage button is displayed when the ratio calculated in real time coincides with the second reference value, and the changed mirror setting information is stored upon selection of the storage button.

10. The method according to claim 9, wherein a driver's name is input and stored upon selection of the storage button.

11. The method according to claim 1, further comprising:
    calculating, by the controller, optimum mirror setting information for minimization of blind spots of the vehicle to correspond to the information regarding positions of the driver's eyes; and
    displaying, by the controller, a recommended blind spot coverage screen that displays blind spots and viewable spots based on the optimum mirror setting information.

12. The method according to claim 11, wherein the recommended blind spot coverage screen further displays information regarding a ratio of an area of all blind spots to an area of all blind spots covered based on the optimum mirror setting information.

13. The method according to claim 11, wherein the recommended blind spot coverage screen further displays a recommendation button, and the mirror plane angle of an in-vehicle mirror is adjusted based on the optimum mirror setting information upon selection of the recommendation button.

14. The method according to claim 11, wherein automatic switching from the current blind spot display screen to the recommended blind spot coverage screen is performed by the controller when a prescribed time has elapsed after display of the current blind spot display screen.

15. The method according to claim 14, wherein the mirror plane angle of an in-vehicle mirror is automatically adjusted based on the optimum mirror setting information when a prescribed time has elapsed after the automatic switching from the current blind spot display screen to the recommended blind spot coverage screen.

16. The method according to claim 14, wherein the blind spots and the viewable spots are displayed in the form of a visually identifiable image.

17. An apparatus of displaying blind spots of a vehicle, the apparatus comprising:
    a memory configured to store program instructions; and
    a processor configured to execute the program instructions, the program instructions when executed configured to:
    receive information regarding positions of the driver's eyes from a driver state monitoring system;

receive current mirror setting information on a per in-vehicle mirror basis from a mirror drive unit;

calculate blind spots and viewable spots using the information regarding positions of the driver's eyes and the current mirror setting information; and output a current blind spot coverage screen that displays the calculated blind spots and viewable spots, wherein the blind spots indicate currently non-viewable spots which are made viewable by changing the mirror setting and the current blind spot coverage indicates an area which is made viewable by the current mirror setting among the blind spots.

18. The apparatus according to claim 17, wherein the program instructions when executed are further configured to:

calculate a ratio of an area of all blind spots to an area of all blind spots covered based on the current mirror setting information; and display the calculated ratio on the current blind spot coverage screen.

19. The apparatus according to claim 17, wherein the program instructions when executed are further configured to:

recalculate the blind spots and the viewable spots using the changed mirror setting information when mirror setting information is changed according the operation of an in-vehicle mirror adjustment button; and display the recalculated blind spots and viewable spots on the current blind spot coverage screen.

20. The apparatus according to claim 17, wherein the program instructions when executed are further configured to:

calculate optimum mirror setting information for minimization of blind spots of the vehicle to correspond to the information regarding positions of the driver's eyes; and display a recommended blind spot coverage screen displaying blind spots and viewable spots based on the optimum mirror setting information.

21. A non-transitory computer readable medium containing program instructions executed by a processor or controller, the computer readable medium comprising:

program instructions that receive information regarding positions of the driver's eyes from a driver state monitoring system;

program instructions that receive current mirror setting information on a per in-vehicle mirror basis from a mirror drive unit;

program instructions that calculate blind spots and viewable spots using the information regarding positions of the driver's eyes and the current mirror setting information; and program instructions that output a current blind spot coverage screen that displays the calculated blind spots and viewable spots, wherein the blind spots indicate currently non-viewable sports which are made viewable by changing the mirror setting and the current blind spot coverage indicates an area which is made viewable by the current mirror setting among the blind spots.

22. The non-transitory computer readable medium of claim 21, further comprising:

program instructions that calculate a ratio of an area of all blind spots to an area of all blind spots covered based on the current mirror setting information; and program instructions that display the calculated ratio on the current blind spot coverage screen.

23. The non-transitory computer readable medium of claim 21, further comprising:

program instructions that recalculate the blind spots and the viewable spots using the changed mirror setting information when the mirror setting information is changed according to operation of an in-vehicle mirror adjustment button; and program instructions that display the recalculated blind spots and viewable spots on the current blind spot coverage screen.

24. The non-transitory computer readable medium of claim 21, further comprising:

program instructions that calculate optimum mirror setting information for minimization of blind spots of the vehicle to correspond to the information regarding positions of the driver's eyes; and program instructions that display a recommended blind spot coverage screen displaying blind spots and viewable spots based on the optimum mirror setting information.

* * * * *